United States Patent [19]

Bugnon et al.

[11] Patent Number: 4,889,562
[45] Date of Patent: Dec. 26, 1989

[54] ORGANIC PIGMENTS COATED WITH CROSSLINKED ETHYL CELLULOSE

[75] Inventors: Philippe Bugnon, Essert; Bernhard Medinger, Giffers, both of Switzerland

[73] Assignee: Ciba-Geigy Corporation, Ardsley, N.Y.

[21] Appl. No.: 202,857

[22] Filed: Jun. 6, 1988

[30] Foreign Application Priority Data

Jun. 16, 1987 [CH] Switzerland ............... 2258/87

[51] Int. Cl.$^4$ .................. C08K 5/00; C09D 11/40; B32B 5/16; C08L 1/08
[52] U.S. Cl. .................... 106/204; 106/194; 106/209; 106/266; 106/493; 106/501; 428/402.24
[58] Field of Search ............ 428/402.24; 106/209, 106/194, 493, 204, 501, 266

[56] References Cited

U.S. PATENT DOCUMENTS

| | | | |
|---|---|---|---|
| 3,370,971 | 2/1968 | Linton | 106/434 |
| 3,544,500 | 12/1970 | Osmond et al. | 428/402.24 |
| 3,639,133 | 2/1972 | Linton | 106/434 |
| 3,691,090 | 9/1972 | Kitajima et al. | 428/402.24 |
| 4,049,615 | 9/1977 | Elsener et al. | 523/208 |
| 4,135,943 | 1/1979 | Morishita et al. | 106/209 |
| 4,242,506 | 12/1980 | Schweiger | 106/194 |
| 4,579,942 | 4/1986 | Brode et al. | 106/170 |
| 4,798,741 | 1/1989 | Nelson | 427/213.33 |
| 4,808,230 | 2/1989 | Bugnon et al. | 106/483 |

FOREIGN PATENT DOCUMENTS 1519069 6/1969 Fed. Rep. of Germany .
950294 2/1964 United Kingdom .

Primary Examiner—Theodore Morris
Attorney, Agent, or Firm—Stephen V. O'Brien

[57] ABSTRACT

A composition containing an organic pigment, the particles of which pigment are provided with a tenacious, dense, highly crosslinked coating of ethyl cellulose.

Pigment compositions of this kind are distinguished in particular by their color strength, by their excellent rheological properties in varnish and printing ink systems, by the high gloss of the finishes obtained therewith, and by the substantial non-deformation of the plastic mouldings pigmented therewith.

15 Claims, No Drawings

ORGANIC PIGMENTS COATED WITH CROSSLINKED ETHYL CELLULOSE

The present invention relates to organic pigments, the particles of which are provided with a tenacious coating of crosslinked ethyl cellulose. They are distinguished by excellent properties, especially by very good rheological properties.

It is commonly known to coat pigments with plastics in order to improve their resistance to binders and solvents or to heat, or to reduce as far as possible the propensity to deformation of the plastic mouldings pigmented therewith; and coating methods are disclosed, for example, in German Offenlegungsschrift specifications 1 519 069 and 2 436 204. It is known from French patent specification 1 253 937 to coat pigments with metal salts of acid organic compounds to improve their gloss.

Very surprisingly, it has now been found that organic pigments whose particles are provided with a tenacious, dense, highly crosslinked coating of ethyl cellulose have good general properties and, in particular, are distinguished by very good rheological properties.

Accordingly, the present invention relates to compositions containing an organic pigment whose particles are provided with a tenacious, dense, highly crosslinked coating of ethyl cellulose.

The highly crosslinked coating of ethyl cellulose is produced by reacting the previously applied layer of ethyl cellulose with a customary cross-linking agent. Some examples of suitable crosslinking agents are given below.

Particularly suitable crosslinking agents are esters of formula:

$$Q(OR)_4$$

wherein Q is Sn, Si, Pb, Ge, Ti, Or, Zr, and R is $C_1$-$C_4$alkyl. Q is preferably Si, Ti or Zr. R as $C_1$-$C_4$alkyl is, for example, methyl, ethyl, n-propyl, isopropyl, n-butyl, sec-butyl or tert-butyl, and is preferably ethyl, n-propyl, isopropyl or n-butyl. Inorganic compounds of Zr, Ti and Sn such as $ZrOCl_2$, $TiOSO_4$ and $SnCl_4$ can also conveniently be used as crosslinking agents.

Particularly interesting crosslinking agents are also boron compounds such as boric acid and salts thereof, preferably alkali metal salts of polyboric acids, for example sodium and potassium tetraborate, as well as aluminium compounds of formulae:

$$Al(NO_3)_3, Al_2(SO_4)_3 \text{ or } MeAl(SO_4)_2,$$

wherein Me is potassium or sodium. Boric acid, sodium tetraborate, aluminium nitrate and aluminium sulfate are preferred.

In principle, any compound which contains an aldehyde group is also suitable for use as crosslinking agent. Particularly useful compounds, however, are aldehydes of formula $$R^1CHO \text{ or } OHC—R^2—CHO,$$

wherein $R^1$ is hydrogen, $C_1$-$C_6$alkyl or phenyl, and $R^2$ is a direct bond or a $-(CH_2)-_n$ group in which n is an integer from 1 to 4. Typical examples of such aldehydes are: formaldehyde, acetaldehyde, propionaldehyde, n-butyraldehyde, isobutyraldehyde, n-valeraldehyde, isovaleraldehyde, n-caproaldehyde, n-heptaldehyde, benzaldehyde, glyoxal, succinaldehyde, glutaraldehyde and adipaldehyde. Preferred aldehydes are formaldehyde and glyoxal.

Very suitable crosslinking agents are also dihalides of $C_2$-$C_8$dicarboxylic acids such as oxalyl dihalides, malonyl dihalides, succinyl dihalides, glutaryl dihalides, adipyl dihalides or phthalyl dihalides, as well as $C_1$-$C_6$-dihaloalkanes such as methylene, ethylene, ethylidene, trimethylene, tetramethylene, pentamethylene and hexamethylene halides. Preferred halides are bromides or, in particular, chlorides.

The pigment particles coated with a dense, highly crosslinked coating of ethyl cellulose as described above can additionally be provided with a tenacious, dense coating of silica and/or alumina.

Accordingly, the invention also relates to compositions such as those described hereinabove, wherein the pigment particles are additionally provided with a tenacious, dense coating of silica and/or alumina, which coating is fixed by polycondensing a silicate and/or aluminate with still free hydroxyl groups of the ethyl cellulose.

If the pigment particles are coated with silica, then the polycondensation with silicates is effected via "active" silica, the nature and preparation of which is described, for example, in U.S. Pat. Nos. 3 370 971 and 3 639 133. It is preferred to start from commercial sodium silicate.

If the pigments are coated with alumina, the polycondensation is carried out in situ from alumina formed from an aluminate. The alumina can be obtained, for example, direct from a water-soluble sodium, potassium or magnesium aluminate, in the presence of dilute mineral acid and at a pH in the range from 5 to 10, or from an aqueous aluminate by adjusting the pH to a value from 5 to 7.

If an aluminate is used, dense, substantially amorphous alumina ("dense alumina") is obtained at pH 5–7, and substantially crystalline alumina ("boehmite") at pH 7–10.

It is also possible to use an $SiO_2$ as well as an $Al_2O_3$ donor (selected from the compounds described above) or a mixture of the two, so that a mixed coating of silica and alumina is formed.

All customary organic pigments, for example azo pigments, quinacridones, phthalocyanines, indanthrones, flavanthrones, pyranthrones, perylenes, dioxazines, perinones, thioindigo, quinophthalones and, in particular, diketopyrrolopyrroles, isoindolines, isoindolinones and metal complexes, are suitable for the preparation of the compositions of this invention, which is carried out as described below.

The organic pigment is dispersed by conventional methods in water or a lower alkyl alcohol (e.g. methyl, ethyl, n-propyl, isopropyl, n-butyl, sec-butyl, tert-butyl or amyl alcohol). To this suspension is conveniently added 1 to 20% by weight, preferably 4 to 12% by weight, based on the pigment, of ethyl cellulose in powder form or as solution (in the latter case, then preferably dissolved in the same solvent in which the pigment is dispersed). The mixture is normally stirred for at least 1 hour in the temperature range from 20° to 50° C. The suspension is then heated to 50°–80° C., with stirring, and, after addition of the crosslinking agent in an amount of 10 to 150 mol%, preferably 20 to 50 mol%, based on the ethyl cellulose, stirred for a further 2 to 8 hours. When using boron compounds as crosslinking agents, it is advisable to carry out the process in the alkaline range and, when using aldehyde crosslinking agents, in the acid range. After cooling, the product is isolated by filtration, washed with water, and dried at 80°–120° C. in a vacuum drying oven.

If it is desired to provide the coated pigment particles with an additional coating of silica and/or alumina, the procedure is typically as follows:

The suspension obtained as described above is simply diluted with at least the same amount of water without isolating the product, or else the isolated product, moist with water, is suspended in water.

The suspension is then heated, with stirring, to 60°–100° C. and then 0.5 to 50, preferably 1 to 25 and, most preferably, 2 to 12% by weight of active silica or alumina formed in situ is added. Stirring is continued for 2 to 4 hours and the batch is then neutralised and filtered. The filter residue is washed with water and dried at 80°–120° C. in a vacuum drying oven.

Active silica is obtained, for example, by adjusting the suspension, heated to 60°–100° C., to pH 7–10 with one of the organic or inorganic bases referred to above, then slowly adding sodium silicate and sulfuric acid together in the desired amount, while ensuring that the pH always remains in the alkaline range.

$Al_2O_3$ formed in situ is obtained, for example, by slowly adding either a solution of sodium aluminate to the suspension, heated to 60°–100° C., up to pH 5–9 and keeping the pH constant by addition of sulfuric acid, or by adding a solution of aluminium sulfate up to pH 5–7 and keeping the pH in this range by addition of a base.

Suitable bases for adjusting the pH are inorganic and organic compounds, for example aqueous sodium hydroxide, aqueous potassium hydroxide, ammonia, sodium alcoholate, potassium alcoholate or pyridine.

The compositions of this invention are suitable for use as pigments for colouring high molecular organic material.

Examples of high molecular organic materials which may be coloured or pigmented with the compositions of this invention are cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

Also suitable are high molecular organic materials in dissolved form as film formers, e.g. boiled linseed oil, nitrocellulose, alkyd resins, phenolic resins, melamine resins, acrylic resins and urea/formaldehyde resins.

The above high molecular compounds may be singly or as mixtures in the form of plastics, melts or of spinning solutions, varnishes, paints or printing inks. Depending on the end use, it is advantageous to use the compositions of the invention as toners or in the form of preparations. The compositions of the invention are preferably employed in an amount of 0.01 to 30% by weight, preferably 0.1 to 10% by weight, based on the high molecular organic material to be pigmented.

The pigmenting of the high molecular organic compounds with the compositions of the invention is carried out for example by incorporating such a composition, if appropriate in the form of a masterbatch, into the substrates using roll mills, mixing or grinding machines.

The pigmented material is then brought into the desired final form by methods which are known per se, for example calendering, moulding, extruding, coating, spinning, casting or by injection moulding. It is often desirable to incorporate plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after working the composition into the polymers. To obtain different shades, it is also possible to add fillers or other chromophoric components such as white, coloured or black pigments, in any amount, to the high molecular organic compounds, in addition to the composition of this invention.

For pigmenting varnishes and printing inks, the high molecular organic materials and the compositions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved in the solvent and subsequently all the components are mixed.

The colourations obtained, for example in plastics, filaments. varnishes or prints, have good allround fastness properties such as good dispersibility, high transparency, good fastness to overspraying, migration, heat, light, and weathering.

The compositions of this invention are distinguished most particularly by excellent colour strength, by outstanding rheological properties in varnish and printing ink systems, by high gloss and excellent "DOI" (distinctness of image) of the finishes obtained therewith, and by substantial non-deformation of the plastic mouldings pigmented therewith.

Because of the good rheological properties of the pigment compositions of this invention, it is possible to prepare varnishes with high loadings of pigment.

The compositions of this invention are preferably suitable for colouring aqueous and/or solvent-containing varnishes, especially automotive varnishes. The most preferred utility is for metallic effect finishes.

The invention is illustrated by the following Examples, in which percentages are by weight, unless otherwise indicated.

EXAMPLE 1

A slurry of 10 g of the isoindolinone pigment, C.I. Pigment Yellow 110, in 100 ml of isopropanol is dispersed in conventional manner. To this dispersion are added 100 ml of a 1% solution of ethyl cellulose in isopropanol. The suspension is stirred for 2 hours at room temperature before the temperature is raised to 80° C. Then a mixture of 210 mg of tetraethoxy silicate and 25 ml of isopropanol are added and the suspension is stirred for 6 hours at 80° C. After cooling, the product is isolated by filtration, wahed with isopropanol and water, and dried at 80° C. in a vacuum drying oven.

EXAMPLE 2

10 g of the diketopyrrolopyrrole pigment, C.I. Pigment Red 255, are dispersed in 100 ml of isopropanol as described in Example 1. To the dispersion are then added 100 ml of a 1% solution of ethyl cellulose in isopropanol over 5 minutes. The suspension is stirred for 2½ hours at room temperature. To the suspension is then added a mixture of 300 mg of a 95% solution of zirconium(IV) propylate in isopropanol and 50 ml of isopropanol over 30 minutes. The temperature is raised to 80° C. and the suspension is stirred for a further 3 hours. After cooling, the product is isolated by filtration, washed with isopropanol and water, and dried at 80° C. in a vacuum drying oven.

EXAMPLE 3

The procedure of Example 1 is repeated, using a mixture of 740 mg titanium(IV) butylate and 25 ml of isopropanol as crosslinking agent instead of the mixture of tetraethoxy silicate/isopropylate.

EXAMPLE 4

The procedure of Example 1 is repeated, using a solution of 375 mg of $Al(NO_3)_3.9H_2O$ in 25 ml of ethanol instead of the mixture of tetraethoxy silicate/isopropanol. Before it is filtered, the suspension is neutralised.

EXAMPLE 5

The procedure of Example 1 is repeated, replacing C.I. Pigment Yellow 110 by the same amount of the metal complex pigment, C.I. Pigment Yellow 129, and using a solution of 50 mg of $H_3BO_3$ in 50 ml of isopropanol as crosslinking agent instead of the mixture of tetraethoxy silicate/isopropanol. Before the suspension is stirred at 80° C., the pH is adjusted to 8 by addition of NaOH.

EXAMPLE 6

The procedure of Example 5 is repeated, using a mixture of a solution of 305 mg of $Na_2B_4O_7.10H_2O$ in 2 ml of water and 48 ml of isopropanol as crosslinking agent instead of the solution of boric acid in isopropanol.

EXAMPLE 7

The procedure of Example 1 is repeated, replacing the mixture of tetraethoxy silicate/isopropanol by a mixture of 171 mg of a 35% aqueous solution of formaldehyde and 60 ml of isopropanol as crosslinking agent. Before it is stirred at 80° C., the suspension is adjusted to pH 4 by addition of glacial acetic acid and neutralised before filtration.

EXAMPLE 8

The procedure of Example 7 is repeated, using a solution of 60 mg of glyoxal in 30 ml of isopropanol as crosslinking agent instead of the mixture of formaldehyde/isopropanol.

EXAMPLE 9

58.5 g of a 35.9% moist filter cake of the γ-quinacridone pigment, C.I. Pigment Violet 19, are dispersed in 500 ml of isopropanol as described in Example 1. The dispersion is stirred for 1 hour and filtered. The filter cake is once more dispersed in 200 ml of isopropanol. Then 200 ml of a 1% solution of ethyl cellulose in isopropanol are added over 10 minutes and the suspension is stirred for 2 hours at room temperature. Half of the pretreated pigment suspension is heated to 80° C. and then a mixture of 500 mg of tetraethoxy silicate and 20 ml of isopropanol is added over 5 minutes. The suspension is stirred for a further 3 hours. After cooling, the product is isolated by filtration, washed with isopropanol and water, and dried at 80° C. in a vacuum drying oven.

EXAMPLE 10

10 g of the isoindolinone pigment, C.I. Pigment Yellow 110, are dispersed in 100 ml of a 1% solution of ethyl cellulose in isopropanol. The suspension is stirred for 16 hours at room temperature before raising the temperature to 60° C. Then 100 ml of water are added. A solution of 0.165 g of $TiOSO_4$ in 10 ml of water is slowly added and the suspension is stirred for 3 hours. After cooling, the product is isolated as described in Example 1.

EXAMPLE 11

10 g of the isoindolinone pigment, C.I. Pigment Yellow 110, are dispersed in 100 ml of a 1% solution of ethyl cellulose in isopropanol. The suspension is stirred for 16 hours at room temperature before raising the temperature to 60° C. Then a mixture of 1.05 g of $SnCl_4$ and 25 ml of isopropanol is added and stirring is continued for 3 hours. After cooling, the product is isolated by filtration, washed with isopropanol and then with water until neutral, and dried at 80° C. in a vacuum drying oven.

EXAMPLE 12

10 g of the isoindolinone pigment, C.I. Pigment Yellow 110, are dispersed in 100 ml of a 1% solution of ethyl cellulose in isopropanol. The suspension is stirred for 16 hours at room temperature before raising the temperature to 60° C. Then a mixture of 1.3 g of $ZrOCl_2$ and 25 ml of water and 25 ml of isopropanol is slowly added and stirring is continued for 3 hours. After cooling, the product is isolated by filtration, washed with isopropanol and with water until neutral, and dried.

EXAMPLE 13

20 g of C.I. Pigment Yellow 110 are dispersed in 200 ml of a 1% solution of ethyl cellulose in isopropanol. The suspension is stirred for 1 hour at room temperature before raising the temperature to 60° C. A mixture of 1.3 g of a 95% solution of zirconium(IV) propylate in isopropanol is added and stirring is continued for 4 hours.

(a) Half of the suspension is heated to 80° C. and diluted with 200 ml of water. After raising the pH to 8.5 by addition of 1N NaOH, 1.9 g of sodium silicate (25% $SiO_2$), diluted with 50 ml of water, and 13 ml of a 0.2M solution of $H_2SO_4$, diluted with 50 ml of water, are added simultaneously over 40 minutes. The pH remains constant at 8.5–8.7. The suspension is then stirred for 3 hours. After cooling, the product is isolated by filtration, washed with water until neutral, and dried at 80° C. in a vacuum drying oven.

(b) The second half of the suspension is heated to 80° C. and diluted with 200 ml of water. The pH is 6.5. A solution of 3.3 g of $Al_2(SO_4)_3.18H_2O$ in 50 ml of water and 50 ml of a 0.5N solution of NaOH are added simultaneously over 40 minutes, while the pH remains constant at ~6.5. The suspension is then stirred for 3 hours. Finally, the product is isolated by filtration as described in (a).

EXAMPLE 14 (a, b)

The procedure described in Example 13(a) and (b) is repeated, using a 1:1 mixture of 130 mg of boric acid in 20 ml of water and isopropanol as crosslinking agent instead of the solution of zirconium(IV) propylate, and the pH is raised to 8.0.

EXAMPLE 15 (a, b)

The procedure of Example 13(a) and (b) is repeated, using a mixture of 1.3 g of a solution of titanium(IV) butylate and 20 ml of isopropanol as crosslinking agent instead of the solution of zironium(IV) propylate.

EXAMPLE 16

The procedure of Example 1 is repeated, using a solution of 310 mg of succinyl dichloride in isopropanol as crosslinking agent instead of the mixture of tetraethoxy silicate/isopropanol. Before the suspension is stirred at 60° C., the pH is adjusted to the slightly alkaline range by addition of a solution of sodium isopropylate in isopropanol.

EXAMPLE 17

The procedure of Example 1 is repeated, using a solution of 304 g of dichlorobutane in 50 ml of isopropanol as crosslinking agent instead of the mixture of tetraethoxy silicate/isopropanol. Before the suspension is stirred at 60° C., the pH is adjusted to the slightly alkaline range by addition of a solution of sodium isopropylate in isopropanol.

USE EXAMPLES 18–26

To determine the flow properties, the compositions of this invention listed in the following Table, as well as the corresponding untreated pigments, are incorporated in conventional manner into an alkyd paint system (Setal ® 84, Kunstharzfabriek Synthesis B. V., Holland; solids content: 70% by weight).

The flow properties of the mill bases so obtained, which contain 9% by weight of pigment and 40.5% by weight of total solids, and whose pigment/binder ratio is 0.3, are determined with a HAAKE viscosimeter (®Rotovisco RV 12; measuring temperature: 25° C., measuring system: SV-SP, shear range: D=0–100 [1/s]). For simple characterisation of the flow curve, viscosity values at D=10 [1/s] and 100 [1/s], calculated from an optimum regression curve, can be cited.

Lower values denote enhanced flow properties.

| Example | Composition | Viscosity values in mPa.s at D = 10 [1/s] | at D = 100 [1/s] |
|---|---|---|---|
| 18 | C.I. Pigment Yellow 110 + ethyl cellulose + tetraethoxy silicate (Example 1) | 817 | 151 |
| 19 | C.I. Pigment Red 255 + ethyl cellulose + Zr(IV) propylate (Example 2) | 269 | 77 |
| 20 | C.I. Pigment Yellow 110 + ethyl cellulose + Ti(IV) butylate (Example 3) | 1045 | 188 |
| 21 | C.I. Pigment Yellow 110 + ethyl cellulose + Al(NO$_3$)$_3$ (Example 4) | 984 | 172 |
| 22 | C.I. Pigment Yellow 129 + ethyl cellulose + H$_3$BO$_3$ (Example 5) | 581 | 126 |
| 23 | C.I. Pigment Yellow 129 + ethyl cellulose + Na$_2$B$_4$O$_7$ (Example 6) | 633 | 124 |
| 24 | C.I. Pigment Yellow 110 + ethyl cellulose + formaldehyde (Example 7) | 924 | 183 |
| 25 | C.I. Pigment Yellow 110 + ethyl cellulose + glyoxal | 811 | 156 |
| 26 | (Example 8) C.I. Pigment Violet 19 + ethyl cellulose + tetraethoxy silicate (Example 9) | 154 | 45 |

The viscosity values reported in the following Table are obtained for the corresponding untreated pigments.

| Pigment | Viscosity values in mPa.s at D = 10 [1/s] | at D = 100 [1/s] |
|---|---|---|
| C.I. Pigment Yellow 110 | 1320 | 297 |
| C.I. Pigment Yellow 129 | 1628 | 369 |
| C.I. Pigment Red 255 | 448 | 108 |
| C.I. Pigment Violet 19 | 169 | 54 |

USE EXAMPLES 27–37

To determine the flow properties, the compositions of this invention listed in the following Table, as well as the corresponding untreated pigments, are incorporated in conventional manner into an alkyd paint system (®Setal 84, Kunstharzfabriek Synthesis B. V., Holland; solids content: 70% by weight).

The flow properties of the mill bases so obtained, which contain 12% by weight of pigment and 54% by weight of total solids, and whose pigment/binder ratio is 0.3, are determined with a HAAKE viscosimeter (®Rotovisco RV 12; measuring temperature: 25° C., measuring system: SV-SP, shear range: D=0–100 [1/s]). For simple characterisation of the flow curve, viscosity values at D=10 [1/s] and 100 [1/s], calculated from an optimum regression curve, can be cited.

Lower values denote enhanced flow properties.

| Example | Composition | Viscosity values in mPa.s at D = 10 at [1/s] | at D = 100 [1/s] |
|---|---|---|---|
| 27 | C.I. Pigment Yellow 110 + ethyl cellulose + TiOSO$_4$ (Example 10) | 1979 | 581 |
| 28 | C.I. Pigment Yellow 110 + ethyl cellulose + SnCl$_4$ (Example 11) | 2070 | 541 |
| 29 | C.I. Pigment Yellow 110 + ethyl cellulose + ZrOCl$_2$ (Example 12) | 1897 | 535 |
| 30 | C.I. Pigment Yellow 110 + ethyl cellulose + Zr(propylate)$_4$ + SiO$_2$ (Ex. 13a) | 2435 | 671 |
| 31 | C.I. Pigment Yellow 110 + ethyl cellulose + Zr(propylate)$_4$ + Al$_2$O$_3$ (Ex. 13b) | 2100 | 635 |
| 32 | C.I. Pigment Yellow 110 + ethyl cellulose + boric acid + SiO$_2$ (Example 14a) | 2049 | 559 |
| 33 | C.I. Pigment Yellow 110 + ethyl cellulose + boric acid + Al$_2$O$_3$ (Example 14b) | 2013 | 518 |
| 34 | C.I. Pigment Yellow 110 + ethyl cellulose + Ti(n-butylate)$_4$ + SiO$_2$ (Ex. 15a) | 2309 | 582 |
| 35 | C.I. Pigment Yellow 110 + ethyl cellulose + Ti(n-butylate)$_4$ + Al$_2$O$_3$ (Ex. 15b) | 2144 | 579 |
| 36 | C.I. Pigment Yellow 110 + ethyl cellulose + succinoyl dichloride (Ex. 16) | 2037 | 543 |
| 37 | C.I. Pigment Yellow 110 + | 2463 | 639 |

| Example | Composition | Viscosity values in mPa.s at D = 10 at [1/s] | at D = 100 [1/s] |
|---|---|---|---|
| | ethyl cellulose + dichlorobutane (Example 17) | | |

The viscosity values obtained for C.I. Pigment Yellow 110 are as follows:
at D = 10 [1/s]: 3782 mPa.s
at D = 100 [1/s]: 833 mPa.s

What is claimed is:

1. A composition containing an organic pigment, the particles of which pigment are provided with a tenacious, dense, highly crosslinked coating of ethyl cellulose.

2. A composition according to claim 1, wherein the highly crosslinked coating of ethyl cellulose is obtainable by reacting the previously applied layer of ethyl cellulose with a compound of formula $Q(OR)_4$, wherein Q is Sn, Si, Pb, Ge, Ti or Zr, and R is $C_1$-$C_4$alkyl.

3. A composition according to claim 1, wherein the highly crosslinked coating of ethyl cellulose is obtainable by reacting the previously applied layer of ethyl cellulose with a compound of formula $Q(OR)_4$, wherein Q is Si, Ti or Zr, and R is ethyl, n-propyl, isopropyl or n-butyl.

4. A composition according to claim 1, wherein the highly crosslinked coating of ethyl cellulose is obtainable by reacting the previously applied layer of ethyl cellulose with boric acid or a salt thereof.

5. A composition according to claim 1, wherein the highly crosslinked coating of ethyl cellulose is obtainable by reacting the previously applied layer of ethyl cellulose with boric acid or sodium tetraborate.

6. A composition according to claim 1, wherein the highly crosslinked coating of ethyl cellulose is obtainable by reacting the previously applied layer of ethyl cellulose with an aluminium compound of formula $Al(NO_3)_3$, $Al_2(SO_4)_3$ or $MeAl(SO_4)_2$, wherein Me is potassium or sodium.

7. A composition according to claim 1, wherein the highly crosslinked coating of ethyl cellulose is obtainable by reacting the previously applied layer of ethyl cellulose with $Al(NO_3)_3$ or $Al_2(SO_4)_3$.

8. A composition according to claim 1, wherein the highly crosslinked coating of ethyl cellulose is obtainable by reacting the previously applied layer of ethyl cellulose with an aldehyde of formula $R^1$—CHO or OHC—$R^2$—CHO, wherein $R^1$ is hydrogen, $C_1$-$C_6$alkyl or phenyl, and $R^2$ is a direct bond or a $-(CH_2)_n$ group in which n is an integer from 1 to 4.

9. A composition according to claim 1, wherein the highly crosslinked coating of ethyl cellulose is obtainable by reacting the previously applied layer of ethyl cellulose with formaldehyde or glyoxal.

10. A composition according to claim 1, wherein the highly crosslinked coating of ethyl cellulose is obtainable by reacting the previously applied layer of ethyl cellulose with a dihalide of a $C_2$-$C_8$dicarboxylic acid.

11. A composition according to claim 1, wherein the highly crosslinked coating of ethyl cellulose is obtainable by reacting the previously applied layer of ethyl cellulose with a $C_1$-$C_6$dihaloalkane.

12. A composition according to claim 1, wherein the pigment is a diketopyrrolopyrrole, isoindoline, isoindolinone or metal complex pigment.

13. A composition according to claim 1, which contains the ethyl cellulose in an amount of 1 to 20% by weight, based on the pigment.

14. A composition according to claim 1, wherein the highly crosslinked coating of ethyl cellulose is obtainable by reaction of the previously applied layer of ethyl cellulose with a crosslinking agent in an amount of 10 to 150 mol%, based on the ethyl cellulose.

15. High molecular organic material containing a composition as claimed in claim 1.

* * * * *